Dec. 6, 1966   J. H. LUX ETAL   3,290,198
METHOD OF FORMING A SERIES OF UNFILLED
CONTAINERS FROM THERMOPLASTIC TUBING
Filed Oct. 23, 1963   2 Sheets-Sheet 1
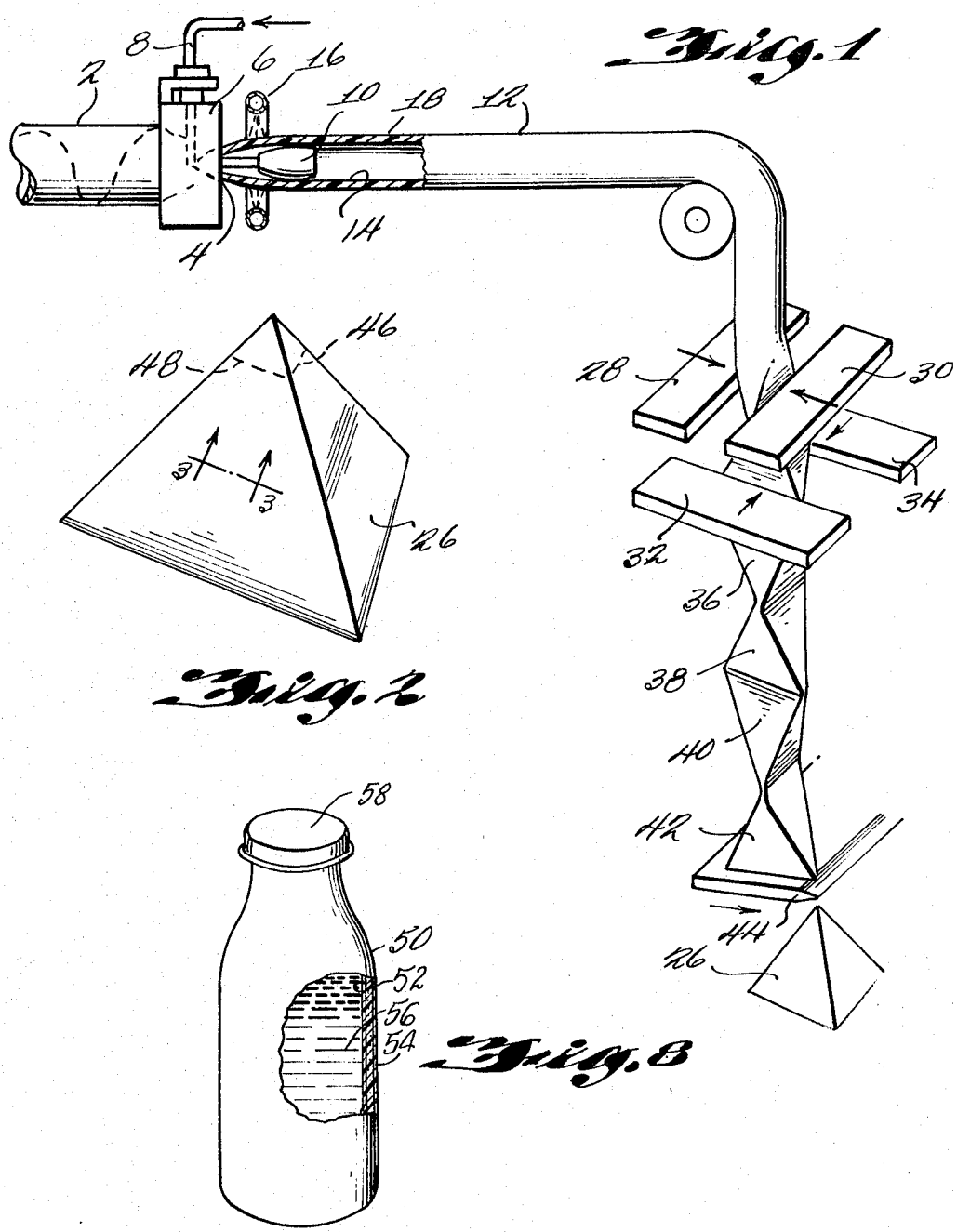
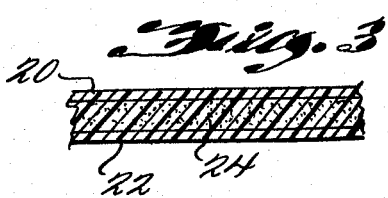
INVENTORS
JOHN H. LUX
ERNEST O. OHSOL
BY
Cushman, Darby & Cushman
ATTORNEYS

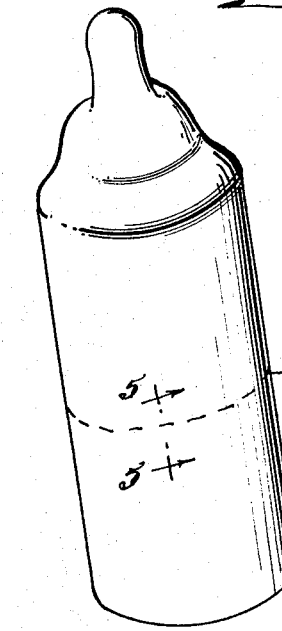
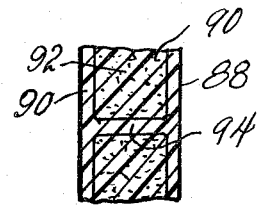
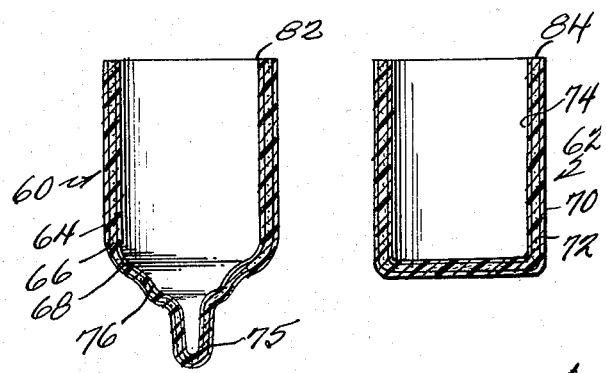
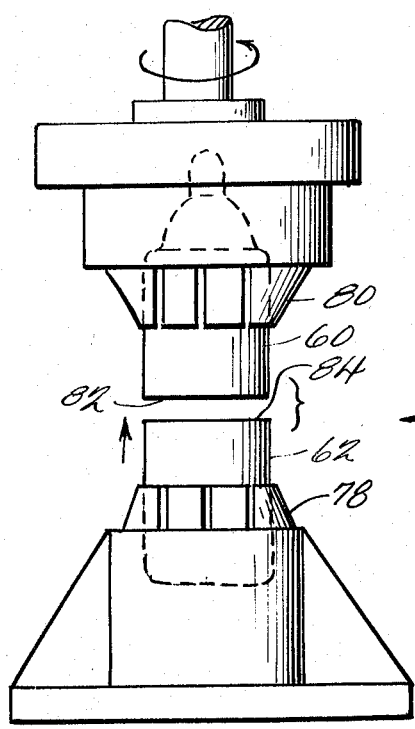

United States Patent Office

3,290,198
Patented Dec. 6, 1966

3,290,198
METHOD OF FORMING A SERIES OF UNFILLED CONTAINERS FROM THERMOPLASTIC TUBING
John H. Lux, Charlestown, Md., and Ernest O. Ohsol, Wilmington, Del., assignors, by mesne assignments, to Haveg Industries, Inc., a wholly-owned subsidiary of Hercules Powder Company, New Castle, Del., a corporation of Delaware
Filed Oct. 23, 1963, Ser. No. 318,386
1 Claim. (Cl. 156—198)

This invention relates to the preparation of milk bottles and other containers.

In the past, foamed plastics have not been used in food applications because of the bacterial contamination problems. The use of low cost plastic containers for milk has not yet achieved fruition on any substantial scale because of rigidity requirements.

It has also been difficult and expensive to form certain container shapes by blow molding, injection molding or similar processes because of their completely closed shapes or reentrant curvatures.

It is an object of the present invention to prepare foam plastic containers for milk and other food products.

Another object is to prepare such containers free of contamination.

A further object is to prepare containers for milk and other products which will withstand sterilization temperatures.

Yet another object is to prepare lightweight containers for milk and other products.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications wtihin the spirit and scope of the invention will become apparent to those skilled in the art from this detailed description.

According to one aspect of this invention it has been found that milk containers can be prepared from foamed thermoplastic materials having at least one unfoamed, non-porous, integral skin.

The use of low cost plastic containers for milk has not yet achieved fruition on any substantial scale because of rigidity and cleanliness requirements. Foamed plastics have not proven suitable in food applications because of the bacterial contamination problems. By having at least one integral, faultless, non-porous, unfoamed skin on the foamed container freedom from contamination is assured. Additionally, the combination of the integral skin and foam combination insures the combination of rigidity, light weight and low cost. There can be unfoamed, non-porous, integral skins on both sides of the foamed core for maximum protection—or only a single skin can be employed. If only a single skin is used, preferably it is on the interior of the container to prevent the milk from penetrating into the foam structure. The containers of the present invention are resistant to breakage and shattering, are easily filled and can be sealed by any conventional type of closure, e.g., a press-on closure, a screw closure, a lug closure or a crown closure or a heat-shrunk, biaxially oriented plastic closure, e.g., made of biaxially oriented Saran (vinylidene chloride-vinyl chloride copolymer, 80:20), or biaxially oriented polypropylene.

When employing polystyrene and materials of similar density it is desirable that the foam have a density between 5 and 45 lbs./cu. ft., preferably between 12 and 35 lbs./cu. ft. The skin or skins is essentially unexpanded and has a considerably higher density than the foamed portion or core, e.g., the skins can have a density of 60 to 66 lbs./cu. ft.

Various polymers can be used to form the foamed plastic.

When employing polystyrene there can be employed normal crystal grade polystyrene or high impact polystyrene or a mixture containing 5 to 95% normal crystal grade polystyrene and the balance high impact polystyrene. When employing a thermoplastic styrene polymer it normally contains greater than 50% by weight of styrene and preferably at least 70% by weight of styrene in its structure. High impact polystyrenes are frequently prepared by polymerizing monomeric styrene in the presence of 2½ to 10% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 95% polystyrene and 5% polyisoprene, and a copolymer of 99.5% styrene and 0.5% divinyl benzene.

Unless otherwise indicated, all parts and percentages are by weight.

The foamable thermoplastic resins which can be extruded according to the invention include cellulose ethers and esters, e.g., ethyl cellulose, cellulose acetate, cellulose acetate-butyrate, homopolymers and interpolymers of monomer compounds containing the $CH_2=C<$ grouping, such as olefins, e.g., ethylene, propylene, isobutylene, butene-1, vinyl halides, e.g., vinyl chloride; vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluoroethylene, tetrafluoroethylene, hexafluoropropylene, unsaturated carboxylic acids and derivatives thereof, e.g., acrylic acid, methacrylic acid, methyl acrylate, ethyl acrylate, methyl methacrylate, acrylamide, acrylonitrile, methacrylonitrile, and interpolymers of the above-mentioned vinylidene monomers with alpha, beta-unsaturated polycarboxylic acids and derivatives thereof, i.e., maleic anhydride, diethyl maleate, dibutyl fumarate, diallyl maleate, dipropyl maleate, etc. A preferred class of materials with which optimum results are obtained are rigid, relatively non-elastic, thermoplastic resins, such as homopolymers and interpolymers of vinyl chloride, e.g., polyvinyl chloride, vinyl chloride-vinyl acetate copolymer (87:13), vinyl chloride-acrylonitrile copolymer (80:20); homopolymers of vinylidene aromatic hydrocarbons and ring halogenerated derivatives thereof, e.g., styrene, o-chlorostyrene, p-chlorostyrene, 2,5-dichlorostyrene, 2,4-dichlorostyrene, p-methylstyrene, p-ethylstyrene, alpha-methylstyrene, vinyl naphthalene and interpolymers of such vinylidene monomers with each other and with other vinylidene monomers in which the interpolymer contains at least 70% of the vinylidene aromatic hydrocarbon compound, e.g., a copolymer of 70% styrene and 30% acrylonitrile. One of the preferred class of resins is thermoplastic styrene polymers containing at least 70% by weight of styrene in the structure.

Other suitable thermoplastic resins include polylcarbonates, e.g., the polymer from bisphenol-A and diphenyl carbonate; polyoxymethylene (Delrin), oxymethylene-alkylene oxide copolymers, e.g., oxymethylene-alkylene oxide (95:5) polyurethanes, e.g., from toluene diisocyanate and polypropylene glycol molecular weight 2025; Dacron (polyethylene terephthalate), nylon (e.g., polymeric hexamethylene adipamide). ABS terpolymers can be used, e.g., the terpolymer of 25% butadiene, 15% acrylonitrile and 60% styrene (a rigid ABS terpolymer), as well as other terpolymers containing 25 to 60% butadiene, 10 to 20% acrylonitrile and 20 to 60% styrene.

The invention is of particular value with foams from polyethylene (of high density, e.g., 0.960, medium density, e.g., 0.935 or low density, e.g., 0.914), polypropylene, copolymers of ethylene and propylene (e.g., 50–50 copolymer) and regular or high impact polystyrene. Copolymers of ethylene with butene-1 (e.g., 9:10) also can be employed.

To insure the formation of a uniform, foamed portion or core a nucleating agent should be used in forming the foamed container. The container itself can be formed by blow molding a foamed tube of plastic having an unfoamed skin or skins, or it can be vacuum formed from a foamed plastic sheet having one or two external skins.

When a nucleating agent is employed, it is used in an amount of from 0.02 to 10% of the total polystyrene by weight. Preferably, 0.4 to 2% of the nucleating agent is used.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicaronate, calcium caronate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid and phthalic acid. In place of the anhydrous acids or salts there can be used the solid hydrates, e.g., oxalic acid dihydrate and citric acid monohydrate.

While not essential, there can also be added a wetting agent such as Bayol 35 (a petroleum aliphatic hydrocarbon white oil), kerosene having an average of at least 8 carbon in the molecule, alkylphenolalkylene oxide adducts, e.g., Triton X–100 (t-octylphenol-ethylene oxide adduct having 10 ethylene oxide units in the molecule), sodium lauryl sulfate and sodium dodecylbenzene sulfonate. The wetting agent can be nonionic or anionic.

The preferred mode of incorporating the foaming agent into the polymer is by premixing the pelletized, solid, thermoplastic polymer, e.g., high impact styrene polymer, with a minor amount of an absorbent having absorbed thereon a volatile liquid, (i.e., the foaming agent) which is non-reactice with and which has not more than a slight solvent action on the polymer. The volatile liquid should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1 to 15%, preferably, 0.5 to 10% by weight of the polymer, although up to 25 or 30% of absorbent can be employed. The absorbent is an inert filler of large surface area but small particle size, e.g., 200 mesh or below.

As the volatile liquid there can be used aliphatic hydrocarbons boiling between 10° and 100° C. and preferably between 30° and 90° C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, perchloroethylene, dichlorotetrafluoroethane, isopropyl chloride, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is non-reactive with the particular polymer employed. Usually, the amount of volatile liquid will be 0.1 to 15% by weight of the polymer, e.g., polystyrene, to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The free-flowing powder consisting of the low boiling solvent or semi-solvent adsorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of an extruder.

The material is formed into a foamed sheet or tube by hot extruding the foamable thermoplastic resin composition in the form of a sheet or tube. If a foamed sheet is to be formed, the upper and lower surfaces only of the sheet, as it emerges from the extruder, are rapidly chilled to prevent expansion thereof while permitting the still warm core of the sheet to expand. It is also possible to chill only one surface if a single skin is to be formed. If a foamed tube is to be formed, the inner and outer surfaces of the tube, as it emerges from the tubular die of an extruder, are rapidly chilled to prevent expansion thereof while permitting the still warm core of the tube to expand. If only an inner skin is desired, then only the inner surface of the tube is chilled. The thus-prepared foamed sheet or tube can be formed into a container in various manners. Thus, the foamed tube having an integral internal (or external and internal) unfoamed, non-porous, tough skin can be blow molded to form a cylindrical container using conventional blow molding procedures. The foamed sheet having an upper (or upper and lower) unfoamed, non-porous, tough skin can be vacuum formed into a container by using conventional vacuum drawing techniques, e.g., as shown in Caine application Serial No. 176,148, filed February 27, 1962. The foamed tube also can be vacuum formed into a tetrahedron.

In general, the foamed core comprises 50 to 96% of the total thickness of the skins and core. The skins each normally range from 3 to 25% of the total thickness. While the density of the foam can be from 5 to 75% of the density of the unfoamed polymer, preferably, it is 10 to 50% of the density of the unfoamed polymer.

The inner and outer skins are foamed as stated by rapid chilling, i.e., quenching, the surfaces of the sheet or tube as it commences to foam. The chilling can be done with an air blast, an air-water mist, argon, helium, nitrogen, water or other inert fluid. If two skins are present, they can be of the same or different thickness. Skins of different thicknesses can be formed, for example, by using a lower temperature or a higher flow rate for the quenching fluid (or both) on the inner surface than on the outer surface of the material. Convenient cooling conditions are 70° F. with air or an air-water mist at 60 ft./sec. The cooling temperature can vary from 0° to 100° F. and cooling fluid flow rates of 40 to 100 ft./sec. are satisfactory.

Chilling the inner surface, e.g., with an air blast, is shown in more detail in Lux application Serial No. 287,128, filed June 11, 1963.

The final foamed containers can have a total thickness of 10 to 300 mils. In general, the larger the containers the thicker should be the unfoamed skins.

The containers can be used with milk, either whole milk or skim milk or buttermilk, cream, fruit juices, e.g., orange juice, grape juice, grapefurit juice, tangerine juice, lemon juice or other beverages.

The containers can be cylindrical or bulbous, or they can be folded or creased. Tetrahedron-type containers are very useful for stacking purposes.

In another aspect, the present invention relates to the formation of foamed containers having at least one covering skin (i.e., either an internal or external skin) by spin welding. There can be employed any of the plastics previously set forth, although in order to prepare products which will resist the high temperatures employed in certain uses, special types of plastics should be employed, as described hereinafter.

Certain container shapes are difficult or expensive to form by blow molding, injection molding and similar processes because of their completely closed shapes or reentrant curvature. By the use of the spin-welding technique containers can be economically molded. Thus, two halves of a container can be thermoformed, e.g., vacuum formed, in conventional fashion and then spin welded together. Alternatively, the two halves can be injection molded. Thus, there can be prepared a container having a bottom cylindrical portion and a top frusto-conical portion ending in a nipple shape. The bottom and top portions can be vacuum formed separately from a foamed sheet having upper and lower integral, unfoamed, non-porous skins and prepared in the manner previously set forth. Thus, the bottom portion can be rotated rapidly, e.g., at 1,000 to 10,000 r.p.m. around a vertical axis. The top portion is momentarily prevented from rotating and is gradually pressed onto the spinning portion from a holding device which permits the initially non-rotating portion of the container to achieve a condution or rapid rotation. Thus, as the stationary portion is brought into contact with the lower spinning portion, there is initially a high relative velocity between the surfaces being brought into contact (e.g., horizontal plane surfaces) and, consequently, a rapid generation of heat which brings the contiguous surfaces to the welding temperature. As this occurs, the initially stationary upper portion of the container is accelerated into rotation and eventually reaches the same angular velocity as the initially spinning lower portion. The acceleration and fusion can be regulated to coincide timewise, if desired, by adjusting the clamping pressure, frictional drag and air or other fluid cooling at the weld line. When the sealing is accomplished the container is released and sent to further processing. Instead of rotating the lower portion of the container initially, it is possible to rotate the upper portion while initially keeping the lower portion from rotating. It is also possible to join the two halves of a foamed thermoplastic container having at least one skin by carrying out the spin welding about a horizontal axis.

The outward rims of the two halves (the rims which are to be joined together) can be matingly compressed, e.g., to one-half their original foamed thickness prior to the spin welding. These relatively dense rim surfaces are then eminently suited for the functional heating to fusion temperatures by spin welding either about a horizontal or a vertical axis.

It is essential to have the skin on the foamed container portion and, preferably, there should be both inner and outer skins. If the container were an all-foam (unskinned) material, the poor heat transfer characteristics of the foam would cause a very irregular and imperfect heat sealed joint between the halves.

The thus-formed container can be filled by puncturing the bottom of the container with a needle, filling through the needle, removing the needle and then heating the nub of material (formed when originally inserting the needle) to melt the same and fill the hole caused by the needle.

This procedure can be used to form a wide variety of containers, e.g., for the use with milk (whole or skim), cream, fruit juices, e.g., orange, grapefruit, grape, lemon and prune juices, carbonated beverages, e.g., cola drinks, club soda and ginger ale, beer, coffee, salad dressing, lubricating oil, liquid shampoos, bleaching solution, soup and even ice cream.

When appropriate temperature-resistant thermoplastics are employed they are particularly valuable as disposable sterilizable containers. Thus, after filling with milk, fruit juice or other beverage or foodstuff they can be heated to sterilizing temperature, e.g., 220° to 260° F. for 1 minute to 1 hour or longer. The use of skinned foam-type material makes possible the minimum of material for a given degree of container rigidity and also makes possible the formation of self-insulating containers.

Suitable materials for use in preparing containers which are sterilized either before or after filling are low pressure, high density (e.g., 0.94) polyethylene, polypropylene, polyethylene irradiated to an extent of 4 to 30 megarads, e.g., 12 megarads, high pressure, low density (e.g., 0.916 polyethylene cross-linked sufficiently to raise its melting or softening point to 250° F., e.g., as shown in Rainer Patent 2,877,500, copolymers of ethylene with propylene or butene-1 having softening points of 240° F. or above, polycarbonates, e.g., the polycarbonate from diphenyl carbonate and bisphenol-A, polyoxymethylenes, e.g., of molecular weight of 15,000 or above. In addition to oxymethylene homopolymers there can be used copolymers having 50 to 99.9%, preferably 85 to 99.9% of oxymethylene (—$OCH_2$—) units interspersed with —O—R— units wherein R is a divalent radical containing at least two carbon atoms directly linked to each other and positioned in the chain between the two valences, any substituents in the R radical being inert. The —O—R— units can be those derived by ring opening of ethylene oxide, dioxolane, propylene oxide, tetramethylene oxide, 1,4-dioxane, trimethylene oxide, pentamethylene oxide, 1,2,-butylene oxide, 2,2-di(chloromethyl) 1,3-propylene oxide, etc. Representative oxymethylene homo and copolymers are set forth in Dolce Patent 3,103,499, Walling Patent 3,027,352 and Kray Patent 3,026,299 and the references cited therein.

If the container, e.g., a milk bottle, formed by spin welding is intended for infant feeding, the nipple end, after filling therethrough and sterilizing, can be sealed with a tight fitting, sterile metal foil cap, or with a hot fluid wax material, or with a heat shrunk plastic film, as previously described. These cap materials can be selected so as to be easily cracked off or peeled when it is desired to use the contents of the container.

This invention permits the use of a minimum of material for a given degree of container rigidity, and also makes possible the forming of self-insulating containers.

When the container is formed by blow molding it is stretched in at least one direction at least 25%, and the plastic is thereby oriented. Stretching can be from 25 to 400%, and usually is 50 to 200%.

The invention will be understood best in connection with the drawings, wherein:

FIGURE 1 is a view partially in section illustrating the manner of forming a tetrahedron container according to the invention;

FIGURE 2 is a perspective view of a container made by the process of FIGURE 1;

FIGURE 3 is a sectional view along the line 3—3 of FIGURE 2;

FIGURE 4 is a view of a bottle made by spin welding according to the invention;

FIGURE 5 is a sectional view along the line 5—5 of FIGURE 4;

FIGURE 6 is a view showing the two halves of the container used for spin welding;

FIGURE 7 is a view showing the manner of spin welding; and

FIGURE 8 is a view of a blow molded container, partially broken away in section.

Referring more specifically to FIGURE 1 of the drawings there is provided an extruder 2 having a circular die opening 4.

There is also provided a polystyrene composition by mixing 50 parts of pellets of high impact polystyrene (Foster Grant's Tuflex 216, polystyrene modified with 5% polybutadiene) and 50 parts of pellets of regular crystal polystyrene (Koppers Dylene 8). This composition is designated hereinafter as Composition A. 100 parts of Composition A, 1 part of Celite (diatomaceous earth) having absorbed therein 1 part of pentane (i.e., 2 parts total of Celite-pentane), 0.5 part Bayol 35 and a nucleating agent comprising 0.3 part anhydrous citric acid and 0.4 part of powdered sodium bicarbonate were mixed together to form Composition B. Composition B was then placed in extruder 2, softened and kneaded with the aid of a screw at a temperature of 325° to 350° F. The thus-produced plastic composition entered the die section 6 of the extruder.

Internal cooling was provided by passing tap water through tube 8 to plug 10 which was attached to the die core. The external diameter of the plug was only slightly less than the internal diameter of the tube 12. Since the water inside the plug maintained its temperature well below that of the interior surface 14 of the tube 12 which was formed, this resulted in a rapid cooling of the interior surface.

External cooling was provided by directing a blast of air at room temperature, 70° F., from ring nozzle 16 at a velocity of 80 ft./sec. at the outer surface 18 of the tube 12. The ring nozzle 16 completely circumscribed the tube.

The tube as it emerged from the die opening had a temperature of about 300° F. The rapid chilling formed a skin on the inner surface and a skin on the outer surface of the tube. While the inner and outer surfaces were thus cooled, there was substantially no cooling of the foamed core. These skins are best shown in FIGURE 3 wherein there is shown an external, unfoamed, non-porous tough skin 20 and a corresponding internal, unfoamed, non-porous tough skin 22 integrally united to a foamed core 24.

During the foaming operation the tube expanded about 25% in diameter and about 60% in thickness.

The skinned foamed tube was then formed into a tetrahedron 26 in the following fashion. The tube was passed through a pair of horizontal warm metal pinching blades 28 and 30. The blades moved inwardly as shown by the arrows to pinch the tubing. Spaced below the pinching blades 28 and 30 by a predetermined distance was a second pair of warm metal pinching blades 32 and 34. Blades 32 and 34 moved in the direction of the arrows and pinched the tubing 12 at right angles to the direction of blades 28 and 30 and in a plane vertically below the plane in which the tubing was pinched by blades 28 and 30. In this manner a series of tetrahedron-shaped containers 36, 38, 40, 42 and 26 were formed by sealing edges at right angles to each other at opposite ends of the tube. These tetrahedron containers, after formation, were cut from the tubing, e.g., with knife 44.

Using 3 inch outer diameter tubing there was formed a tetrahedron with approximately 4.72 inches on each side. By spacing the two sets of pinching blades 3.33 inches apart a regular tetrahedron resulted. The container formed had an overall density of 30 lbs./cu. ft., an overall wall thickness of 40 mils, a skin layer of 10 mils on the inside and of 5 mils on the outside. The container had a capacity of about 200 cc. (about 1⁄20 of a gallon). For ease in opening the container one corner was scored along the dotted lines 46 and 48. The container was filled with homogenized milk by injection through a puncturing needle. The resulting hole was then heat sealed to hermetically seal the contents.

In another example polyethylene was foamed into a skinned tube with the aid of pentane absorbed on Celite to form a 1 quart tetrahedron container having inner and outer unfoamed skins and a foamed core. The polyethylene foam was 50 mils thick, had an average overall density of 20 lbs./cu. ft. and inner and outer skins each 10 mils thick.

In another example a 1 quart bottle 50 (FIGURE 8) was blow molded from a parison of foamed Composition B. The bottle had an overall wall thickness of 40 mils, an inner skin 52 of 10 mils, an outer skin 54 of 10 mils and a central core of 25 mils. The bottle was filled with skim milk 56. The container was then closed by applying a cover 58 of biaxially oriented, irradiated polyethylene (irradiated to 12 megarad and then stretched 350% in each direction) and the cover heat shrunk around the top of the bottle.

Polypropylene containing a small amount of pentane absorbed on Celite was extruded to form a sheet having a non-porous, tough upper skin and a non-porous, tough lower skin integrally united to a foam core by air chilling the upper and lower surfaces as the foaming sheet emerged from the extruder. This skinned, foamed sheet was then vacuum formed into the two halves 60 and 62 of a bottle. Bottle half 60 was composed of a non-porous, unfoamed, tough outer skin 64, a foamed core 66 and a non-porous, unfoamed, tough inner skin 68. Similarly, bottle half 62 was composed of a non-porous, unfoamed, tough outer skin 70, a foamed core 72 and a non-porous, unfoamed, tough inner skin 74. Both halves of the bottle had an overall wall thickness of 60 mils with a 10 mil outer skin, a 10 mil inner skin and a 40 mil foam core.

The top half of the container has a generally frusto-conical portion 76 ending in a nipple shape as at 75. The bottom half of the container is of cylindrical shape.

The bottom half 62 of the container is positioned in holding device 78 and the top half 60 of the container is placed in a holding device 80. Holding device 80 is rapidly rotated around its vertical axis, e.g., at 2000 r.p.m. The bottom half 62 is initially clamped and thereby prevented from rotating and is gradually pressed in the direction of the arrow onto the rapidly spinning half 60. Thus, as the stationary portion 62 is brought into contact with the spinning portion 60, there is initially a high relative velocity between the surface 82 of the upper half and the surface 84 of the lower half as they make contact. Consequently, there is a rapid generation of heat which brings the contiguous surfaces to the welding temperature. The non-rotating portion 62 is then gradually released from the clamping pressure so that it can rotate freely around the same axis as spinning half 60 and the portion 62 is thus accelerated into rotation and eventually reaches the same angular velocity (2000 r.p.m.) as the initially spinning portion 60. When the sealing or welding is accomplished the finished container 86 is released and sent to further processing.

As can be seen from FIGURE 5 the wall of the container 86 comprises a non-foamed, non-porous outer skin 88, a non-porous tough inner skin 90 and a foamed core 92. In the area 94 where the spin welding occurs the porosity in the foam portion is greatly reduced and, in some cases, disappears completely due to the heat generated in the spin welding which softens or melts the polypropylene.

The spin welded bottle is filled with tomato soup through an injection needle, the needle withdrawn, the hole sealed up and the bottle and contents sterilized at 250° F. for 30 minutes.

While the present invention is primarily concerned with food containers as set forth above, it should be noted that foamed thermoplastic resin sheets and tubes of the type set forth supra have many other uses such as in forming nestable cups, other nestable containers, e.g., trays, pie dishes and other dishes, blow molded drums, drum liners, e.g., for steel or fiber drums, bottles and flat surfaced, hollow containers, blow molded beverage cases, injection molded crates and cartons, e.g., for eggs and fruit, foldable cartons, e.g., scored sheet, for food, clothing, hard goods cigarette packaging, extruded containers for liquids, pastes, solids and gases heat sealed or not, and with or without closures, pipes for hot or cold liquids or gases, fibers, e.g., wool-like, warm fibers for sweaters, rugs and insulation, thermal insulating shells for piping and fittings, acoustical ceiling panels, wall panels-interior decorative, floor units, roadway and aircraft runway pads, automobile interior wall panels, aircraft and railway car panels, seats and backs for furniture, other furniture surfacing, e.g., bed headboards and desk tops, other housing components, e.g., doors, structural members, window frames, bath tubs, toilet seats, crash helmets, padded dashboards and other safety equipment, walls and trim in boats and other marine items, e.g., surfboards and "sailfish" bodies, book covers, brief cases, luggage, blinds, shutters, translucent windows, lightweight signs, placards and display signs which are easily assembled by heat sealing, structural furniture, e.g., chests, cupboards, cabinets, tables, counters, refrigerator bodies, TV cabinets, fireproof roofing and siding, e.g., shingles, boards and panels, expansible gasketing, molding and sealing strip for housing, aircraft, automotive and marine uses, wire insulation, flameproof conduits, place mats and pads for hot food, storage bins for grain, silage, camera-carrying cases, etc.

What is claimed is:

A method of continuously forming a series of unfilled containers from a hollow tubing of a foamed thermoplastic resin having at least one surface thereof nonporous unfoamed tough skin of said thermoplastic resin consisting of continuously moving the tube while simultaneously clamping and sealing the tubing between a first pair of opposed sealing means and between a second pair of opposed sealing means substantially perpendicular to said first pair of sealing means and spaced apart a predetermined distance along the axis of the tube from said first sealing means whereby there is formed a series of tetrahedron-shaped containers.

References Cited by the Examiner

UNITED STATES PATENTS

| | | | |
|---|---|---|---|
| 2,388,103 | 10/1945 | Whitaker et al. | 99—212 |
| 2,552,641 | 5/1951 | Morrison | 220—9 |
| 2,618,814 | 11/1952 | Paton et al. | 156—145 |
| 2,741,079 | 4/1956 | Rausing | 53—180 |
| 2,829,058 | 4/1958 | Kazmi | 99—212 |
| 2,893,877 | 7/1959 | Nickolls | 99—174 |
| 2,901,357 | 8/1959 | Epstein | 99—171 |
| 2,917,217 | 12/1959 | Sisson | 229—4.5 |
| 2,962,843 | 12/1960 | Hoelzer et al. | 156—145 |
| 3,002,871 | 10/1961 | Tramm et al. | 156—73 |
| 3,062,695 | 11/1962 | Hull | 156—73 |
| 3,134,680 | 5/1964 | Daline | 99—171 |

EARL M. BERGERT, *Primary Examiner.*

HYMAN LORD, *Examiner.*

P. DIER, *Assistant Examiner.*